Patented Nov. 22, 1949

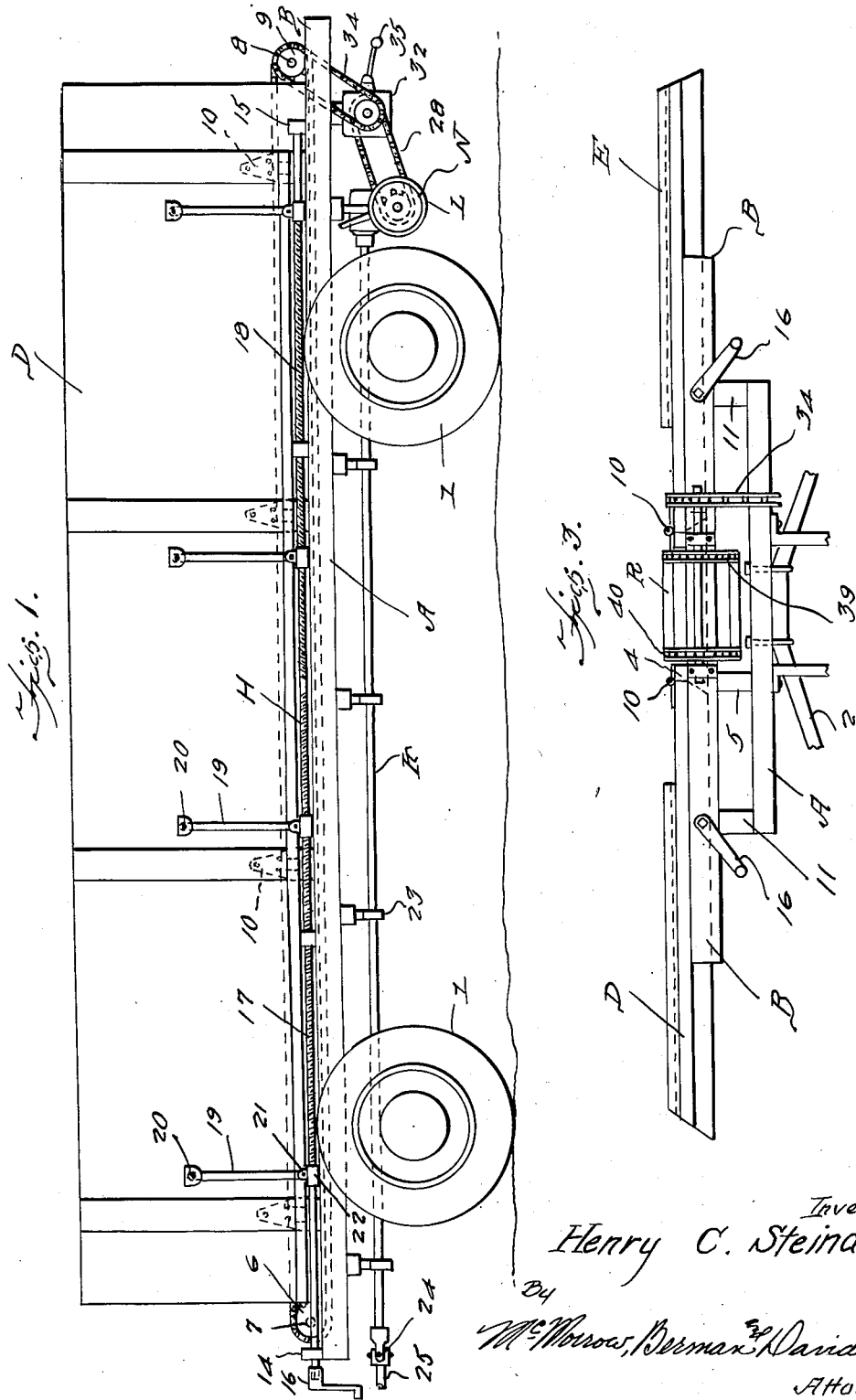

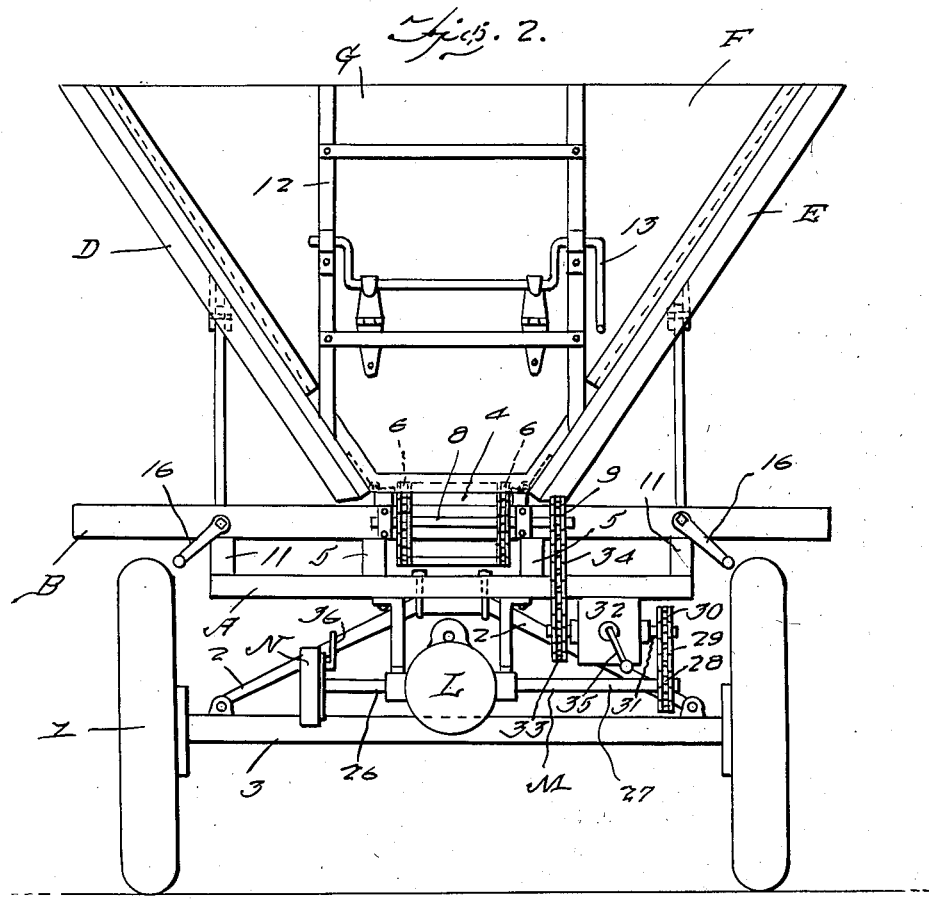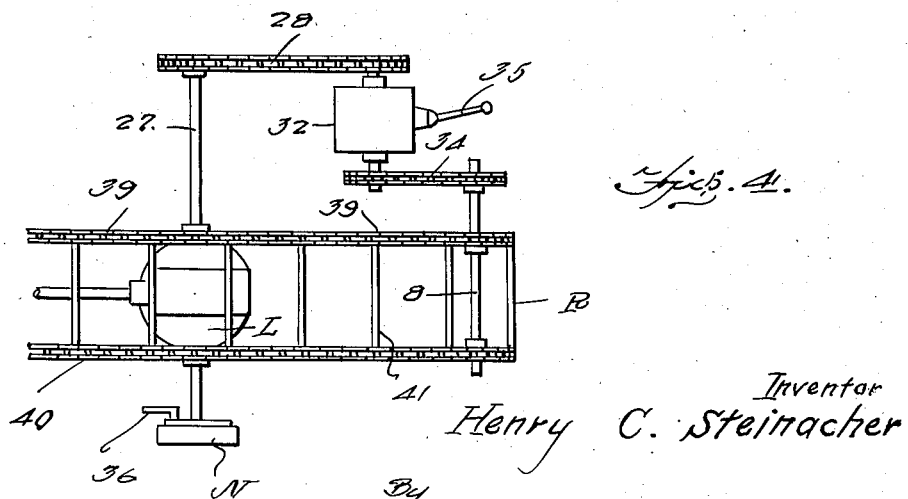

2,489,055

UNITED STATES PATENT OFFICE 2,489,055

SELF-UNLOADING WAGON

Henry C. Steinacher, Carrollton, Ill.

Application January 28, 1947, Serial No. 724,765

2 Claims. (Cl. 214—83.36)

This invention relates to a wagon but more particularly to one having a convertible body which makes it possible to use the wagon for many different purposes the natures of which will be hereinafter pointed out.

The main object of the invention is to provide a general utility wagon for farm use.

Another object of the invention is to provide a wagon the sides of which can be quickly and conveniently raised and lowered.

A further object of the invention is to provide a wagon provided with a power driven unloading conveyor.

A still further object of the invention is to provide an arrangement for connecting the wagon conveyor to the power take-off of a conventional power driven tractor.

A yet further object of the invention is to provide a wagon of the character described which is strong, durable yet inexpensive and will serve many purposes on and about a farm.

Other objects and advantages will appear from the following detailed description of the invention when read in the light of the accompanying drawings, in which:

Fig. 1 is a view in side elevation of the wagon.

Fig. 2 is a rear end view thereof.

Fig. 3 is a rear end view of the wagon with the side walls thereof lowered.

Fig. 4 is a fragmentary top plan view.

Referring in detail to the drawings in which like parts are designated by similar reference characters and numerals, A is a rectangular supporting frame mounted upon a four wheeled chassis the wheels of which are indicated at 1. Specifically the frame at its front and rear ends is connected to and supported upon springs 2 which are carried by and extend upwardly from the chassis axles 3.

The main wagon body frame B is of a rectangular shape and is supported upon longitudinally extending side stringers 11 and center stringers 5 of the supporting frame A.

The wagon bottom 4 is comparatively narrow and an endless conveyor R extends throughout the length thereof, both above and below the bottom, and at the front and rear end of the frame is trained over sprocket wheels 6 carried by and rotatable with the front and rear shafts 7 and 8. The rear shaft is elongated and carries a drive sprocket 9 which is driven in a manner later to be described.

The body has opposite side walls D and E which extend upwardly and outwardly from each side of the bottom 4 at a steep inclination. The walls at their lower ends are hinged to the bottom at a plurality of points 10 throughout their lengths.

When the body is closed the parts are in the positions illustrated in Figs. 1 and 2. Suitable freely removable end gates close the front and rear of the body. The rear end gate F is provided with spaced vertical uprights 12 between which a plate G is slidably supported. The rear end of the body can be partially opened by lifting the plate G which can be accomplished by operating the lever handle 13.

When a flat sideless wagon is desired the body sides are lowered to lie in a horizontal plane as illustrated in Fig. 3. This is easily accomplished as follows. At each side of the frame B there is a longitudinally extending shaft H supported for rotation in bearings 14 and 15 at its ends. These shafts are provided at their front ends with operating handles 16. Extending half the length of each shaft are oppositely threaded portions 17 and 18, that is, portions that have right and left hand threads respectively. Along each body side wall are a plurality of arms 19 the upper ends of which are pivotally connected to the walls at 20 while the lower ends are pivotally connected as at 21 to an internally threaded traveller 22 which is threadedly engaged to its respective shaft H.

It will be obvious that upon rotating the shafts in one direction the arms 19 are swung into the vertical positions illustrated in Fig. 1 which lift the body sides and will retain them in elevated position. Rotation of the shafts in the opposite direction cause the travellers to move longitudinally of the shafts thus lowering the body sides with the arms 19 lying in a horizontal position beneath the sides as illustrated in Fig. 3. With the body sides lowered a flat wagon is provided and the sides are supporting intermediate their heights upon the outwardly extending portions of the frame B, all as appears in Fig. 3.

Power means is provided for driving the conveyor and is as follows. A drive shaft K extends lengthwise of the wagon and is suitably supported throughout its length by a plurality of bearings 23. At its forward end this shaft has quick and detachable connection as at 24 with a power take-off shaft 25 from the tractor. At its rear end this shaft has suitable connection with a differential L provided with a driving shaft M which is horizontally disposed and provided with extending ends 26 and 27. The shaft end 27 is provided with a sprocket 28 over which is trained an endless chain 29 having driving connection with a sprocket 30 carried by the shaft 31 of a suitable transmission gearing within a housing 32.

The transmission is provided in the second shaft carrying a sprocket 33 over which is trained an endless chain 34 having driving connection with the aforementioned sprocket 9 of the conveyor rear shaft 8.

The gearing within the housing 32 is of the conventional transmission type and is for the purpose of increasing or decreasing the speed of rotation of the sprocket 33.

Changes in the driving speed of the sprocket is accomplished by manipulation of the gear shift handle 35. Additionally by proper manipulation of this handle the direction of rotation of the sprocket 33 and hence the conveyor can be controlled at will.

A brake N for the drive axle 26 is provided for the drive shaft M and has an operating handle 26 with the manipulation of which the speed of travel of the conveyor can be regulated. This is possible due to the differential nature of the gearing L. Tightening the brake will cause the shaft portion 27 to turn while releasing the brake will cause rotation of the shaft portion 27 to stop. Although it is not so shown it will be recognized that a means to operate the handle 26 can be easily extended to the driving seat of the tractor to make it possible for the tractor driver to operate the brake which would be desirable under certain uses to which the wagon can be put. Most important however the brake is a safety feature. Should the conveyor get jammed the brake will slip and thus prevent anything from breaking.

The conveyor comprises the pair of spaced parallel endless chains 39 and 40 interconnected by spaced parallel crossbars 41. The width of the conveyor is almost as great as that of the wagon bottom 4.

It will be evident that the wagon is capable of many uses. When the sides are lowered a wagon is provided with a wide flat bottom suitable for supporting or carrying many of the materials which have to be transported on and about a farm.

With the wagon sides up a box wagon resembling a bin is provided which is particularly suited for carrying grain and also sawdust or cinders. With the wagon sides up the contents of the body can be quickly and easily discharged by slightly raising the rear end plate G and starting the conveyor in motion. It would be a simple matter to provide a blower and an elevator at the discharge end of the conveyor. By reversing the direction of travel of the conveyor it can be caused to pull loads up skids or runways on to the wagon when the sides thereof are lowered.

This wagon can be used for many different purposes. When the sides are down baled hay can be loaded upon it and conveniently unloaded on to an elevator which will carry the bales up into a barn. The wagon is also a very good follow-up carrier behind a field chopper. A phosphate or lime spreader can be easily attached at the rear of the wagon. Additionally an electric barb-wire fence winder can be mounted on the wagon to wind up these temporary fences which are now so widely used by farmers.

What I claim is:

1. In a wagon, a wheel-supporting frame, a wagon bottom supported on said frame, and an endless conveyor extending longitudinally of said bottom and carried by the latter, a drive shaft, a chain-and-sprocket means operatively connecting said shaft to said conveyor for driving the latter, brake means on said wagon for stopping actuation of said conveyor, a side wall arranged along each side of said bottom and mounted for swinging movement about a horizontal axis toward and away from each other, and manually actuable means operatively connected to each of said side walls for causing swinging movement of the side walls toward and away from each other.

2. In a wagon, a wheel-supporting frame, a wagon bottom supported on said frame, and an endless conveyor extending longitudinally of said bottom and carried by the latter, a drive shaft, a chain-and-sprocket means operatively connecting said shaft through said conveyor for driving the latter, brake means on said wagon for stopping actuation of said conveyor, a side wall arranged along each side of said bottom and mounted for swinging movement about a horizontal axis toward and away from each other, and manually actuable means operatively connected to each of said side walls for causing swinging movement of the side walls toward and away from each other, said last-named means comprising a pair of spaced parallel rotatable threaded shafts extending longitudinally of said wagon and carried by said frame, a plurality of spaced arms each having its ends pivotally connected to said side walls and said shafts, and handles on one end of each of said shafts for rotating the latter to thereby pivot said side walls.

HENRY C. STEINACHER.

REFERENCES CITED

The following references are of record in the file of this patent:

UNITED STATES PATENTS

| Number | Name | Date |
|---|---|---|
| 768,141 | Olson | Aug. 23, 1904 |
| 1,891,301 | Bordeaux | Dec. 20, 1932 |
| 1,928,859 | Kutscha | Oct. 3, 1933 |
| 2,267,526 | Kutscha | Dec. 23, 1941 |
| 2,321,168 | Tognetti | June 8, 1943 |
| 2,397,045 | Richey | Mar. 19, 1946 |
| 2,405,534 | Voth | Aug. 6, 1946 |
| 2,411,056 | Ricketts | Nov. 12, 1946 |

FOREIGN PATENTS

| Number | Country | Date |
|---|---|---|
| 694,112 | Germany | July 26, 1940 |